Figure 1A:
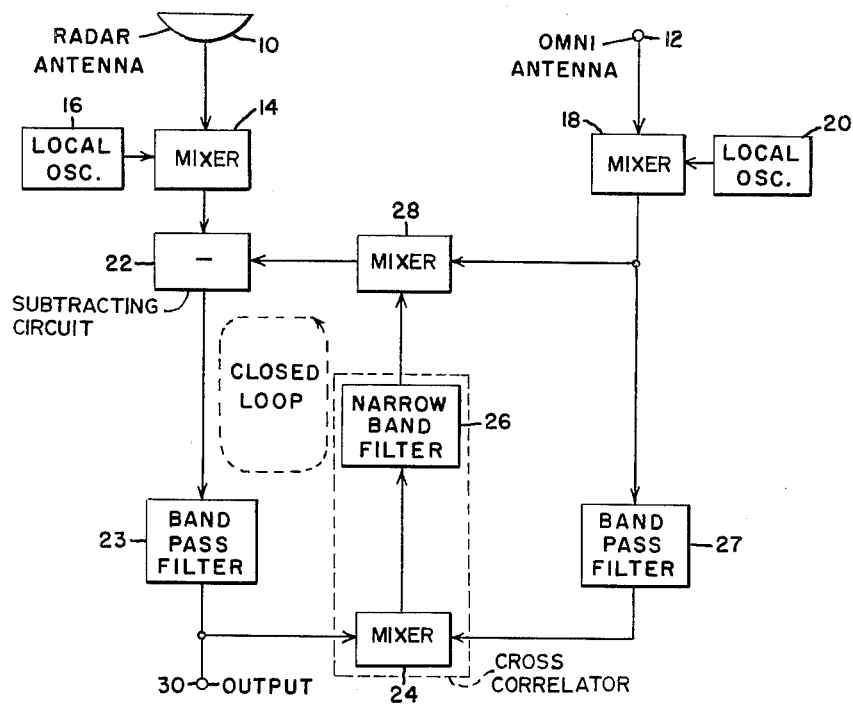

INVENTOR:
PAUL. W. HOWELLS,
BY T. E. Kristofferson
HIS ATTORNEY.

United States Patent Office 3,202,990
Patented Aug. 24, 1965

3,202,990
INTERMEDIATE FREQUENCY SIDE-LOBE CANCELLER
Paul W. Howells, Morrisville, N.Y., assignor to General Electric Company, a corporation of New York
Filed May 4, 1959, Ser. No. 810,961
9 Claims. (Cl. 343—100)

This invention relates to the elimination of jamming in a signal processing system and more particularly to the provision in a signal reception system of a side-lobe canceller employing a minimal amount of duplication of signal processing equipment.

Antenna side-lobes make it possible for a single jammer to be effective against a radar from any angle of azimuth. The jammer power density at the radar antenna is inversely proportional to the square of the distance between the jammer and the radar. Radar signal power density is inversely proportional to the fourth power of the distance between the target and the radar. The jammer thus has a power advantage that overcomes the radar antenna's reduced gain as its side-lobes scan past the jammer.

Side-lobe cancellation is a fundamental approach to elimination of jamming from received signals. A side-lobe canceller uses jammer location to eliminate jamming signals and in effect maintains a null in the radar antenna receiver pattern in the direction of the jammer. To accomplish this effect the side-lobe canceller uses an omni-directional antenna adjacent to the radar antenna.

Prior art side-lobe cancelling systems have used two separate receivers, one for each antenna, adjusting one in amplitude so their outputs may be subtracted to eliminate the jammer at the video level. This approach has disadvantages since it involves the complex problem of matching two complete receivers almost perfectly in band pass, time delay and amplitude response. Video side-lobe cancellation also requires complete duplication of all intermediate frequency signal processing equipment being used with the radar. Accordingly it is an object of this invention to provide side-lobe cancellation without requiring matching of complete receivers.

Another object of this invention is to provide an improved jammer cancelling signal processing circuit.

Still another object of this invention is to permit intermediate frequency signal processing equipment to be used after side-lobe cancellation has taken place.

Still another object of the invention is to provide flexibility in a side-lobe canceller which can be expanded to cancel multiple jammers.

A further object of this invention is to employ phase information for jammer cancellation as well as the amplitude information normally used in video cancellers.

In carrying out the invention in one form thereof a main signal transmission channel is provided having a directional antenna adapted to receive desired signals. This channel is coupled through a conventional first detector to produce an intermediate frequency signal and through a signal combining circuit and a first filter network to an output terminal. An auxiliary signal transmission channel is provided having an omni-directional antenna adapted primarily to receive undesired signals. The omni-antenna is coupled through a conventional first detector to produce an intermediate frequency signal offset from the intermediate frequency signal in the main transmission channel by a fixed amount at least equal to the signal bandwidth. It is then coupled through a filter network having the same time delay as the filter network in the main channel. The output of the main channel and the filter network in the auxiliary channel are coupled to a band pass cross correlator which has an output signal representing the amplitude and phase difference of the components of the undesired signal in each of the two channels. The cross correlator output is then heterodyned with the offset intermediate frequency signal of the auxiliary channel in order to produce an auxiliary channel output at the same frequency as the intermediate frequency in the main channel and with any phase difference removed. This signal is then coupled to the signal combining circuit in the main channel which subtracts it from the signal in the main channel, closing the loop and providing continuous cancellation of the jamming signal in the output of the main channel.

In another form the invention may employ a number of omni-directional antennas in order to provide for cancellation from several jamming sources.

Figure 1B:
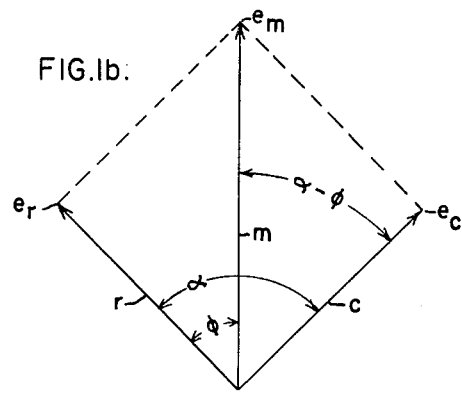
Figure 2:
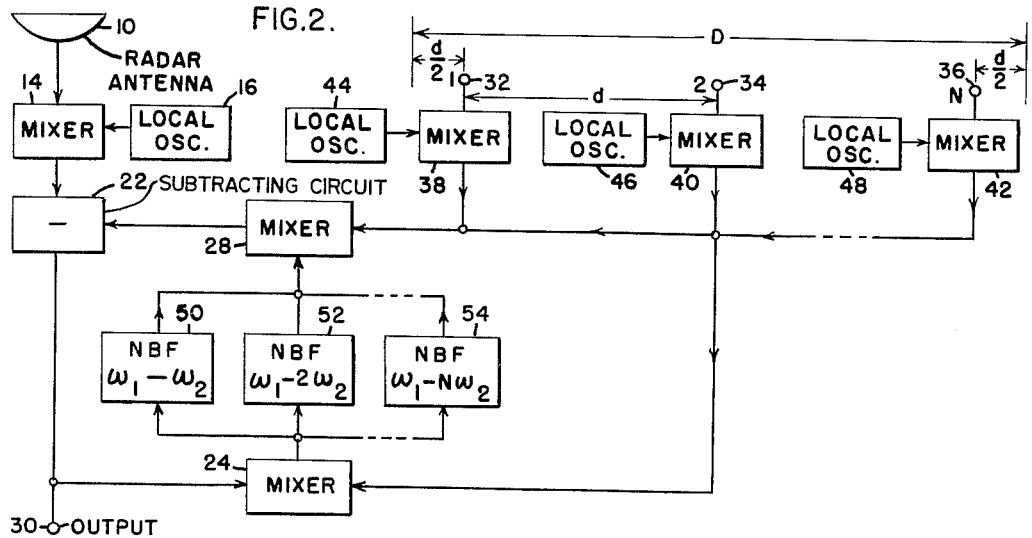

The novel features which are believed to be characteristic of the invention are set forth with particularity in the appended claims. The invention itself however, together with further objects and advantages thereof can best be understood by reference to the following description taken in connection with the accompanying drawings, in which FIG. 1(a) is a block diagram illustrating one embodiment of the invention employing a single omni-antenna, FIG. 1(b) is vector diagram showing certain voltage relationship useful to explain the operation of the circuit of FIG. 1(a), FIG. 2 illustrates in block diagram form another embodiment of the invention extended to be effective against multiple jammers, FIG. 3 represents waveforms useful to explain the operation of the circuit of FIG. 2.

Referring now to the drawings, in FIG. 1 there is illustrated an embodiment of the invention employing a directional radar antenna 10, and a single omni-directional radar antenna 12. The directional antenna receives a desired signal in its main lobe. Jamming is sometimes introduced by means of a high power source of jamming signals located a distance from the target in order to swamp out target information. This jamming may be picked up by a side-lobe of the radar antenna. In order to properly detect a target it is necessary to eliminate that portion of the signal received by the radar antenna which is attributable to jamming. The output of directional antenna 10 is mixed in a mixer 14 with the output of a local oscillator 16. Mixer 14 can be any conventional first detector. The output of omni-directional antenna 12 is mixed in another conventional first detector 18 with the output of a second local oscillator 20, down to an intermediate frequency which is offset in frequency from the intermediate frequency of the radar jamming signal. It is obvious that other techniques of obtaining the desired intermediate frequency may be employed such as the use of a single local oscillator for both channels and then offsetting the frequency of the two channels. The output of mixer 14 is connected through a subtraction circuit 22 and through a band pass filter 23 to one input of a band pass cross correlator comprising a mixer 24 and a narrow band filter 26. The output of mixer 18 is connected through band pass filter 27 to a second input of the mixer 24. The output of narrow band filter 26 is connected to one input of a mixer 28 which has the output of mixer 18 connected to another of its inputs. The output of mixer 28 is connected in turn to a second input of subtraction circuit 22. Directional antenna 10, local oscillator 16, mixer 14, subtraction circuit 22, and band pass filter 23 comprise a main channel having an output terminal 30 located on the connection between band pass filter 23 and mixer 24. Omni-antenna 12, mixer 18, local oscillator 20 and filter 27 comprise an auxiliary channel. The operation of the circuit of FIG. 1 is as follows:

When a jammer is present, the waveform in the main channel may be expressed as a signal carrier having a specified amplitude and phase, modulated by the signal waveform, plus a jammer carrier having the same frequency but some different amplitude and phase, modulated by the jammer waveform. The expression of the jamming signal received at the omni-directional antenna 12 is the same as the expression for the radar antenna jamming signal except for a gain term and a phase shift introduced by the different in path length from the jammer to the omni-directional antenna and from the jammer to the radar. The magnitude of the phase shift depends upon the position of the jammer and the distance between the omni-directional antenna 12 and the radar antenna 10. If the waveform in the auxiliary channel is properly corrected in amplitude the phase, then it may be combined with the main channel waveform in such a manner that the jamming waveforms cancel, while signal in general does not.

Before the jamming can be cancelled by subtraction in subtraction circuit 22 the amplitude and phase of the two jamming signals must be equalized. To do this the omni-directional antenna jamming signal is mixed down to an intermediate frequency in mixer 18 which is offset in frequency from the intermediate frequency of the radar jamming signal present at the output of mixer 14. These signals are then mixed in mixer 24 and narrow band filtered in filter 26 to produce a signal at a frequency equal to the difference between the two intermediate frequencies. The amplitude of this signal is proportional to the average power of the jammer and the phase equals the phase of the jamming signal received at omni-directional antenna 12. The phase difference is cancelled by mixing this signal with the jamming signal in mixer 28. The result of this is a signal at the radar intermediate frequency that is phase equalized and that has an amplitude proportional to the average power of the jammer. This signal is introduced to the radar I.F. channel through substraction circuit 22 forming a nonlinear closed loop providing automatic gain adjustment so that the residual jamming signal approaches zero in the radar intermediate frequency channel. The speed of response of the system is dependent upon the loop gain, and the bandwith of the narrow band filter 26. Since loop gain is proportional to average power, the loop cancels jamming signals which have high average power, while it is relatively insensitive to target returns which have low average power and is thus able to discriminate between the two.

Analyzing the operation of the circuit of FIG. 1 it will be assumed that the average power of the jammer is constant over an integration time comparable to one range sweep, the average jammer power is much greater than the average signal power and the relative time delay between channels is small compared to inverse signal bandwidth. These are all the necessary assumptions but for further convenience it will be assumed that the jammer wave form is wideband noise.

The noise is filtered to the signal bandwith using identical band pass filters, such as filters 23 and 27 in both channels, probably at I.F. Then the narrow band noise in either channel may be regarded as a carrier ($W_r$) located at the center frequency of the band pass filter, and modulated both in amplitude and phase by the complex noise waveform $j(t)$. Under the assumption of small relative time delay between channels, this waveform will be common to both channels.

The relative amplitude and carrier phases of the two channels will depend on the system geometry and jammer location. Let the main channel jammer waveform at R.F. at the output of radar antenna 10 be $$e'_m = mj(t) \cos W_r t \qquad (1)$$

where $m$ is amplitude and $t$ is time, and the auxiliary channel waveform at the output of omni-antenna 12 be $$e'_a = aj(t) \cos (W_r t - \theta) \qquad (2)$$

where $a$ is amplitude and $\theta$ the phase angle.

In converting these signals to the canceller I.F. at the outputs of mixers 14 and 18 respectively, a frequency difference, $w$, is introduced upon mixing the input signals with the output ($W_r + W$) signal of local oscillator 16 and the output of signal ($W_r + W + w$) of local oscillator 20. This frequency difference should confortably exceed the signal bandwidth, but it may be small compared to the I.F.

At the canceller I.F., then, we have:

$$e_m = m j(t) \cos Wt \qquad (3)$$

and $$e_a = aj(t) \cos [(W+w)t + \theta] \qquad (4)$$

The jammer waveform in the main channel may be cancelled by substracting from it the auxiliary channel waveform, $e_a$, appropriately changed in amplitude and shifted in frequency and phase. Signal, which has a different amplitude and phase relation between the two channels, is generally not cancelled.

In the loop shown, these functions are performed by the I.F. cross correlator, comprising the mixer 24 and narrow band filter 26, operating inside a feedback loop. To determine the performance of the loop, assume that the cancellation operation leaves a residue $$e_r = rj(t) \cos (Wt + \phi) \qquad (5)$$

where $r$ is the amplitude and $\phi$ the phase angle.

In the I.F. cross correlator this residue is multiplied by $e_a$ and the product smoothed by the narrow band integrating filter 26, which is located to select the difference frequency $w$. The bandwidth of filter 26 may be controlled to determine the integration time of the cross correlator. Assuming a cross correlator gain of $2G$ and an arbitrary circuit phase of $\alpha$, the integrated product at the output of filter 26 is $$e_i = \overline{2e_r \times e_a} G / \alpha \qquad (6)$$

or $$e_i = \overline{2Grj(t) \cos (Wt+\phi) \times aj(t) \cos [(W+w)t+\theta+\alpha]} \qquad (7)$$

which reduces to $$e_i = rGa \, \overline{j^2(t)} \cos (wt+\theta+\alpha-\phi) \qquad (8)$$

where $\overline{j^2(t)}$ represents average jammer power, $P_j$, and the expressions representing the sum of frequencies resulting from heterodyning the two waveforms together are dropped. The sum of frequencies being dropped in order to conform to the realities of the circuit, since the filter 26 is designed to pass only the difference frequencies and not the sum frequencies.

This smoothed carrier frequency is then used to control the amplitude and phase of $e_a$ which is provided through the cancellation path to cancel the jammer in the main channel. The phase of $e_i$ represents the phase difference and the amplitude is proportional to the required amount of amplitude correction. When $e_i$ is multiplied by $e_a$ in mixer 28 the cancellation voltage obtained at the output of mixer 28 at the difference frequency becomes $$e_c = e_1 \times e_a \quad (9)$$

or $$e_c = rGaP_j \cos(wt+\theta+\alpha-\phi)aj(t)\cos[(W+w)t+\theta] \quad (10)$$

which due to filtering in filter 23 to remove the sum frequencies, becomes $$e_c = ra^2 GP_j j(t) \cos(Wt+\phi-\alpha) \quad (11)$$

Note that $\theta$, the original phase difference between the channels, has been removed. When the loop is closed the cancelled jammer residue is $e_r = e_m - e_c$. Equating real and imaginary parts of these voltages as written in Eq's 3, 5 and 11 yields the relations:

$$\cos\phi = m - ra^2 GP_j \cos(\phi-\alpha) \quad (12)$$

and $$r\sin\phi = -ra^2 GP_j \sin(\phi-\alpha) \quad (13)$$

which yield $$\frac{r}{m} = \frac{1}{\cos\phi + a^2 GP_j \cos(\phi-\alpha)} \quad (14)$$

and $$\sin(\phi-\alpha) = -\frac{\sin\phi}{a^2 GP_j} \quad (15)$$

These equations define the relations between $e_r$, $e_c$ and $e_m$ which are indicated in FIG. 1(b). Equation 15 indicates that whatever the loop phase, $\alpha$, the magnitude of $(\phi-\alpha)$ is small if the loop gain, $a^2 GP_j$, is large.

The loop attempts to adjust the residue phase $\phi$ to cancel the loop phase $\alpha$. Then Equation 14 may be approximated by $$\frac{r}{m} = \frac{1}{\cos\alpha + a^2 GP_j} \quad (16)$$

In particular, if the loop phase $\alpha$ is adjusted to zero, and from Equation 15; $\phi = 0$.

$$\frac{r}{m} = \frac{1}{1 + a^2 GP_j} \quad (17)$$

and from Equation 15; $\phi = 0$.

Equation 17, showing the degree of jammer cancellation obtained, is reminiscent of the conventional feedback equation except that the "loop gain" is a function of the jammer power $P_j$. For constant jammer power, the performance of the loop, including stability criteria affecting the design of the integrating filter 26 should be identical to a conventional loop. Variations of jammer average power at an intermediate rate might cause trouble by modulating loop gain. Very slow or very fast rates will not cause trouble. The slow rate is "D.C." while the fast rate, if it exceeds the bandwidth of the integrating filter 26, merely becomes part of the jammer waveform $j(t)$.

The dependence of cancellation on jammer power is very useful, in that high average power jamming is well cancelled, while low average power signals (in the absence of jamming) are not. If the integration time is N pulse lengths, the cancellation ratios for jamming should exceed that for signal of the same peak power by something like N, as can be seen by referring to Equation 17 with the assumption that the jammer amplitude is near that of the signal.

The side-lobe cancelling technique employing the invention can be extended to be effective against multiple jammers by utilizing additional omni-antennas equally spaced in a linear array as illustrated in the block diagram of FIG. 2. FIG. 2 again illustrates a main channel employing a radar antenna 10 coupled through a mixer 14, having a local oscillator 16 as its other input, and through a subtraction circuit 22 to an output terminal 30. Wherever possible identical numerals are used to designate components similar to those of FIG. 1. Instead of a single omni-directional antenna FIG. 2 employs three omni-directional antennas 32, 34 and 36 equally spaced $d$ meters apart in a linear array. The equivalent width of the array is illustrated as D which extends $d/2$ on either side of the end elements and is equal to the number of elements times the element spacing. These antennas are coupled respectively through mixers 38, 40 and 42 to one input of the mixer 24. The other inputs of mixers 38, 40 and 42 are coupled respectively to local oscillators 44, 46 and 48. The output of mixer 24 is coupled to the input of mixer 28 through three narrow band filters 50, 52 and 54 which are connected in parallel. The second input of mixer 28 is connected to the combined outputs of the three mixers 38, 40 and 42. The output of mixer 28 is then coupled to a second input of subtraction circuit 22.

Figure 3A:
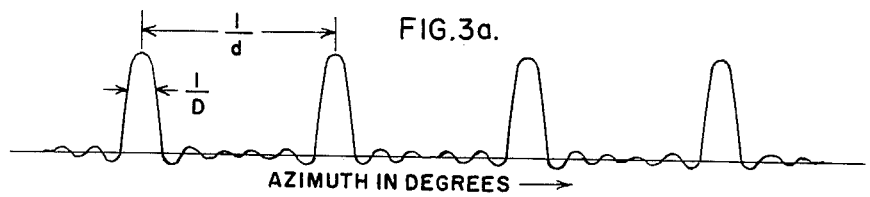

The antenna pattern of such an array as illustrated in FIG. 2 comprises a number of echelon lobes inversely proportional in width to the total length of the array with spacing between the adjacent lobes inversely proportional to the distance between adjacent antennas, as illustrated in FIG. 3a. Phasing the output of the omni-directional antennas 32, 34 and 36, which causes the pattern to scan in azimuth, is accomplished by mixing the outputs of successive ones of the antennas with local oscillator frequencies from local oscillators 44, 46 and 48 that have frequency differences that are integral multiples of the frequency offset of local oscillator 44 from local oscillator 46. In this manner the phase of the signal received at the first omni-directional antenna 32 is shifted by $2\pi$ radians in a period corresponding to one cycle of the local oscillator frequency offset. The signal phase of the second omni-directional antenna 34 is shifted by $4\pi$ radians in the same period of time, and so on, causing the pattern of the linear ray to scan one echelon lobe spacing in a time corresponding to one cycle of the offset frequency of the first local oscillator 44. Each time an echelon lobe of the array scans past a jammer the jamming waveform is sampled. The local oscillator frequency is chosen high enough so that no jamming waveform information is lost.

In the multiple jammer canceller of FIG. 2 the narrow band filter 26 of the single jammer configuration of FIG. 1(a) is replaced by a comb filter, or band of narrow band filters, 50, 52 and 54, tuned to the different frequencies of the omni-antenna intermediate frequency channels and the radar intermediate frequency. As long as not more than one jammer appears at a time in the echelon lobes its signals are cancelled in the radar intermediate frequency channel. The band pass filters 23 and 27 of FIG. 1 may also be inserted in the same channels of FIG. 2 as in FIG. 1 but are not illustrated in the drawing of FIG. 2.

Consider a wavefront approaching the array of omni-antennaes 33, 34, 36 at angle $\theta$, which has just reached the zero element (antenna 32), and appears at this element as $$E_0 = E\cos Wt \quad (18)$$

where E is the amplitude and W the frequency of the wavefront. Because of the angle of arrival, $\theta$, and the element spacing, $d$, this phase front still has $d\sin\theta$ distance to go before reaching the second antenna 34. Since one wavelength, $\lambda$, represents $2\pi$ radians of phase delay, the first element signal at antenna 34 will be delayed in phase by $$\phi_1 = -\frac{2\pi d \sin\theta}{\lambda} \quad (19)$$

radians or its signal will be $$E_1 = E\cos\left(Wt - \frac{2\pi d \sin\theta}{\lambda}\right) \quad (20)$$

In general then the Kth element signal is $$E_K = E\cos\left(Wt - \frac{2K\pi d \sin\theta}{\lambda}\right) \quad (21)$$

This demonstrates the progressive delay of the element signals in phase along the array. Before the element signals are added, a fixed phase shift ($K\alpha$) which varies linearly along the array would, upon addition, result in the summed signals having the form $$E_K = E \cos\left[Wt + K\left(\alpha - \frac{2\pi d \sin\theta}{\lambda}\right)\right] \quad (22)$$

The array response would then be the sum of these divided by the received signal voltage E, or $$P(\theta) = \sum_{K=0}^{N} \cos\left[Wt + K\left(\alpha - \frac{2\pi d \sin\theta}{\lambda}\right)\right] \quad (23)$$

This may be regarded as the sume of ($N+1$) unit phasors having a constant progressive phase difference $$\phi' = \alpha - \frac{2\pi d}{\lambda} \sin\theta \quad (24)$$

Several characteristics of the array pattern $P(\theta)$ may be deduced from an examination of Equation (23). The peak response of the pattern $P(\theta)$ is ($N+1$), and occurs when the phasors are colinear, or when $$\theta' = \pm 2K\pi, \; K=0, 1, 2, 3 \quad (25)$$

From Equation (24) this requires that $$\sin\theta = \frac{\lambda}{2\pi d}(\alpha \pm 2K\pi) \quad (26)$$

Figure 3B:
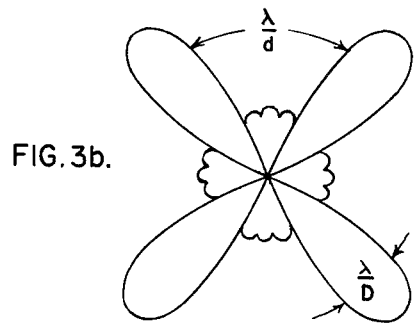

The array pattern may thus have a number of main, or echelon, lobe responses, as illustrated in FIG. 3b, at the valves of $\theta$ defined by Equation (26). The separation between these echelon lobe responses in terms of $\sin\theta$ is $$\Delta_p (\sin\theta) = \lambda_d \quad (27)$$

This leads to the usual requirement for a half-wavelength spacing between elements. When $\lambda_d = 2$ the pattern, which can exist only in the range $-1 \leq \sin\theta \leq 1$, is restricted to just one main lobe, which is usually desired. In some applications a number of such echelon lobes are permissible, so large element spacings may be used.

Equation (26) also indicates how the array pattern may be steered by varying the steering phase $\alpha$. A change in $\alpha$ shifts the location of all main lobe response uniformly in $\sin\theta$, by the amount $$\Delta_\alpha (\sin\theta) = \frac{\lambda}{2\pi d} \Delta\alpha \quad (28)$$

In effect a peak response to a wave is obtained by adjusting $\alpha$ to cancel the phase differences between element signals for that wave.

The width of the main lobes may then also be deduced. As $\theta$ varies from the value yielding peak response, the angle between phasors, $\phi'$, increases from zero, and the line of phasors curls around, reducing the sum $P(\theta)$. The sum goes thru zero when the phasors have curled into a complete circle, or when $$\phi' = \frac{2\pi}{N+1} \quad (29)$$

From Equation 24 the width of the main lobe is then seen to be $$\Delta_w (\sin\theta) = \frac{\lambda}{(N+1)d} \quad (30)$$

as compared to the spacing between echelon lobes of Equation 27. An array with $N+1$ elements should then be able to resolve $N+1$ different signals which are separated in angle by $\Delta w$.

The exact form of the array pattern $P(\theta)$ may be determined from Equation 23 through the use of trigonometric identities. It can be shown that the phase of $P(\theta)$ is $$\phi_P = \frac{N-1}{2}\left(\alpha - \frac{2\pi d \sin\theta}{\lambda}\right) \quad (31)$$

which is the phase of the signal received at the center of the array. The amplitude of $P(\theta)$, for N even, is $$|P(\theta)| = \frac{\sin(N+1)\left(\frac{\pi d}{\lambda}\right)\left(\sin\theta - \frac{\lambda}{2\pi d}\alpha\right)}{\sin\frac{(\pi d)}{\lambda}\left(\sin\theta - \frac{\lambda}{2\pi d}\alpha\right)} \quad (32)$$

This defines a repetitive $\dfrac{\sin x}{x}$ type of pattern having all the properties just described. For N odd, a slightly different expression is obtained but the basic properties are the same.

Figure 3C:
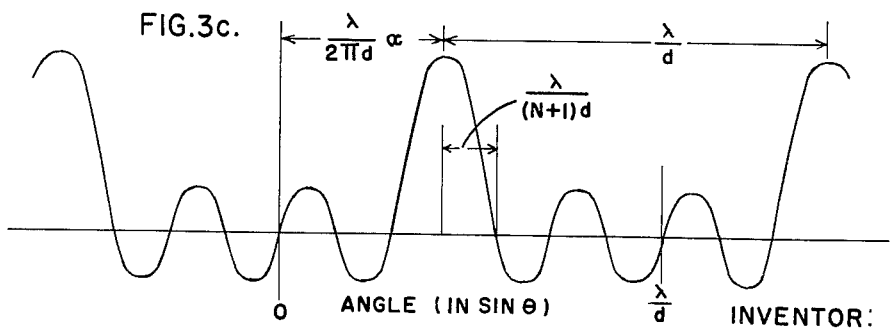

This pattern, for a seven element array (N=6), is shown in FIG. 3(c). As with any antenna, the pattern may be modified to suppress side lobes by modifying the amplitudes of the various element signals before summing.

With the array configuration thus far described, this pattern may be steered to any angular position by changing the steering phase $\alpha$. To make a pattern which scans as rapidly as desired the steering phase $\alpha$ should be replaced by a time varying scanning phase shift. This is done in the circuit illustrated in FIG. 2 by providing the local oscillator frequencies described previously whose frequency offsets amount to phase differences which are scanned in time. The array pattern of FIG. 3c then will move uniformly with time, scanning the distance between echelon lobes ($\lambda/d$) in one cycle of the offset or scanning frequency. This scanning frequency is the frequency difference of the local oscillators 44 and 46. In this time the array pattern has looked in turn at all angles between the echelon lobes, and a signal at some particular azimuth will be sampled at the instant an echelon lobe scans by it. It is seen again when the next echelon lobe hits it $1/f$ seconds later, where $f$ is the scanning frequency.

Assuming that $f$ is at least equal to the signal bandwidth, the signal is properly sampled, that is the samples contain complete information on the signal waveform. In this manner signals which can be resolved in angle by the array pattern will be seen at separate times at the array output so that the time multiplexed form of the sidelobe cancelling loop can independently cancel them.

Once the signals are combined as described above, the circuit of FIG. 2 operates analogously to that of FIG. 1(a).

While particular embodiments of the invention have been illustrated and discussed it will be understood that it is not intended to limit the scope of the invention thereto since many modifications may be made and it is therefore contemplated by the appended claims to cover any such modifications as fall in the true spirit and scope of the invention.

What is claimed as new and desired to be secured by Letters Patent of the United States is:

1. In a noise canceller, a main signal transmission channel having an output terminal, an auxiliary signal transmission channel having an output terminal, said channels having cross coupling therebetween, means for detecting the relative amplitude and phase of each of the cross coupled signals, a compensating cross feed network capable of adjustment for minimizing cross coupling at least one output terminal, means responsive to said relative amplitude and phase for automatically adjusting said cross feed network in order to minimize cross coupling.

2. In an intermediate frequency sidelobe canceller, a main signal transmission channel having a directional antenna adapted to receive desired signals, an auxiliary signal transmission channel having an omni-directional antenna adapted to receive primarily undesired signals, means coupling said directional antenna thru a conventional first detector to produce an intermediate frequency signal and thru a signal combining circuit and a first filter network to an output terminal, means coupling said omni-directional antenna thru a conventional second detector to produce an intermediate frequency signal offset from said first intermediate frequency signal a fixed amount at least equal to the signal bandwidth and thru a filter network having the same time delay as said first filter network to one input of a band pass cross correlator, means coupling said output terminal to another input of said cross correlator, said cross correlator having an output signal representative of the amplitude and phase difference of the components of said undesired signal in each of said channels, means for automatically heterodyning said cross correlator output signal with said offset intermediate frequency signal of said auxiliary channel to produce an auxiliary channel output at the same frequency as the intermediate frequency in said main channel and with any phase difference removed, and means coupling said auxiliary channel output to said combining circuit in order to subtract it from the signal in said main channel.

3. In combination, a main signal transmission channel having an output terminal and adapted to receive a desired and an undesired signal, a second transmission channel adapted primarily to receive undesired signals, means for combining a first portion of the second channel undesired signal with said first channel signals to provide a first signal, means for mixing a second portion of the undesired second channel signal with said first signal to provide a second signal, means for substantially modifying the undesired signal available at said output terminal comprising means responsive to the amplitude and phase of said second signal for controlling the amplitude and phase of said first portion of the second channel undesired signal.

4. In combination, a main signal transmission channel capable of receiving a desired and an undesired signal and having an output terminal, an auxiliary signal transmission channel adapted primarily to receive said undesired signal, correlating means for comparing the portion of said undesired signal present in said main and auxiliary channels to determine their phase and amplitude relationship, means for mixing the output of said correlating means with said undesired signal in said auxiliary channel to provide a compensating signal, means for subtracting said compensating signal from the signals present in said main channel for minimizing the amount of said undesired signal at said output terminal.

5. In an intermediate frequency sidelobe canceller, a main signal transmission channel having an output terminal, an auxiliary signal transmission channel, said channels having cross coupling therebetween, means for detecting the relative amplitude and phase of each of the cross coupled signals, a compensating cross feed network capable of adjustment for minimizing cross coupling at said output terminal, means responsive to said relative amplitude and phase for adjusting said cross feed network in order to minimize cross coupling.

6. In an intermediate frequency slidelobe canceller, a main signal transmission channel having a directional antenna adapted to receive desired signals, an auxiliary signal transmission channel having a plurality of omni-directional antennas arranged in a linear array and adapted to receive undesired signals, means coupling said directional antenna in series thru a first detector to produce a first intermediate frequency signal and thru a signal combining circuit to an output terminal, means coupling each of said omni-directional antennas thru a separate second detector to produce an intermediate frequency signal, the intermediate frequency signal of the omnidirectional antenna adjacent said directional antenna being offset from said first intermediate frequency a fixed amount at least equal to the desired signal bandwidth and each succeeding omni-directional antenna in said linear array being offset an integral multiple of an additional amount which also exceeds the desired signal bandwidth, a cross correlator having a comb of band pass filters each designed to pass one of the intermediate frequencies of a separate one of the first detectors associated with each of said omni-antennas, means connecting the combined outputs of said first detectors associated with said omnidirectional antennas to one input of said cross correlator, means coupling said output terminal to another input of said cross correlator, said cross correlator having an output signal representative of the amplitude and phase difference of the components of said undesired signals present at the outputs of each of said detectors, means for heterodyning said cross correlator output signal with the combined offset intermediate frequency signals of said auxiliary channel to produce an auxiliary channel output having components at the same frequencies as the intermediate frequencies of the signal components in the main channel and with any phase differences removed, and means coupling said auxiliary channel output to said combining circuit in order to subtract the signal components having intermediate frequencies the same as that present in the main channel from the signals in said main channel.

7. In combination, a main signal transmission channel having a directional antenna capable of receiving desired and undesired signals and having an output terminal, an auxiliary signal transmission channel having a plurality of omni-directional antennas adapted primarily to receive said undesired signals, correlating means for comparing the portions of each of said undesired signals present in said main channel and the corresponding undesired signals in said auxiliary channel to determine their phase and amplitude relationship, means for deterodyning the output of said correlating means with the combined undesired signals in said auxiliary channel to provide a compensating signal, means for subtracting the frequency components of said compensating signal having frequency counterparts in said main channel from the signals present in said main channel for minimizing the amount of said undesired signals at said output terminal.

8. In a noise canceller, a main signal transmission channel having an output terminal and an input terminal coupled to receive a signal distorted by noise, an auxiliary signal transmission channel having an output terminal and an input terminal coupled to receive essentially noise, cross correlation means coupled to each of said output terminals for detecting the relative amplitude and phase of said signal and said noise and providing a control signal accordingly, a compensating cross feed network coupled to the output terminal of said auxiliary channel to receive said noise signal and to said cross correlation means to receive said control signal, said cross feed network including means automatically responsive to said control signal to adjust the amplitude and phase of said noise to provide a correcting signal equal in amplitude and phase to the noise appearing at the output terminal of said main channel, and means for subtracting said correcting signal from said signal distorted by noise to generate a pure signal.

9. In a noise canceller, a main signal transmission channel having an output terminal and an input terminal coupled to receive a desired signal from a station and undesired noise from a jamming source, an auxiliary signal transmission channel having an output terminal and an input terminal coupled to receive essentially noise from said jamming source, cross correlation means coupled to each of said output terminals for detecting the relative amplitude and phase of said signal and said noise and providing a control signal, a compensating cross feed network coupled to the output terminal of said auxiliary channel to receive said noise signal and to said cross correlation means to receive said control signal, said cross feed network automatically responsive to said control signal to adjust the amplitude and phase of said noise to provide a correcting signal equal in amplitude and phase to the noise appearing at the output terminal of said main channel, and means for subtracting said correcting signal from said signal distorted by noise to generate a pure signal.

References Cited by the Examiner

UNITED STATES PATENTS

| | | | |
|---|---|---|---|
| 2,043,587 | 6/36 | Macalpine | 330—84 |
| 2,104,635 | 1/38 | Breedlove | 250—20.54 |
| 2,268,998 | 1/42 | Bay | 250—20.54 |
| 2,748,201 | 5/56 | McMillan | 330—84 |
| 2,825,900 | 3/58 | Collbohm | 343—100 |

FOREIGN PATENTS 720,345  12/54  Great Britain.

CHESTER L. JUSTUS, *Primary Examiner.*